(12) United States Patent
Keller et al.

(10) Patent No.: US 7,967,599 B2
(45) Date of Patent: Jun. 28, 2011

(54) RING SHAPED VALVE PISTON AND ITS USE IN A BLOW MOULDING MACHINE

(75) Inventors: Mathias Keller, Wil SG (CH); Daniel Abderhalden, St. Gallen (CH); Phillipp Boos, Frauenfeld (CH)

(73) Assignees: Norgren GmbH, Alpen (DE); KHS Corpoplast GmbH & Co. KG, Hamburg (DE)

( * ) Notice: Subject to any disclaimer, the term of this patent is extended or adjusted under 35 U.S.C. 154(b) by 180 days.

(21) Appl. No.: 12/444,536

(22) PCT Filed: Oct. 17, 2006

(86) PCT No.: PCT/EP2006/010002
§ 371 (c)(1),
(2), (4) Date: Apr. 6, 2009

(87) PCT Pub. No.: WO2008/046433
PCT Pub. Date: Apr. 24, 2008

(65) Prior Publication Data
US 2010/0013131 A1     Jan. 21, 2010

(51) Int. Cl.
 *B29C 49/58*  (2006.01)
(52) U.S. Cl. .............. 425/535; 251/340; 137/251.1
(58) Field of Classification Search .............. 425/535; 137/251.1; 251/340
See application file for complete search history.

(56) References Cited

U.S. PATENT DOCUMENTS

| 4,770,210 A | 9/1988 | Neff et al. |
| 6,905,326 B2 | 6/2005 | Voth et al. |
| 2003/0118686 A1 | 6/2003 | Voth et al. |
| 2008/0069914 A1 | 3/2008 | Lemaistre |

FOREIGN PATENT DOCUMENTS

| DE | 20018500 U1 | 12/2001 |
| FR | 2872082 A1 | 12/2005 |

*Primary Examiner* — Yogendra N Gupta
*Assistant Examiner* — Alison Hindenlang
(74) *Attorney, Agent, or Firm* — The Ollila Law Group LLC

(57) ABSTRACT

A blow molding machine having the valves integrated into the valve block (100) is disclosed. The valve pistons (110) form annular rings stacked vertically along the stretch rod (104) axis. The valve pistons activate by moving up/down along the stretch rod axis. The valve seat for each vertically stacked valve is formed radially around the stretch rod.

8 Claims, 6 Drawing Sheets

RING SHAPED VALVE PISTON AND ITS USE IN A BLOW MOULDING MACHINE

BACKGROUND OF THE INVENTION

1. Field of the Invention

The invention is related to the field of blow molding, and in particular, to a ring shaped valve piston around the stretch rod/blow nozzle hole of a blow molding machine.

2. Background of the Invention

Blow molding uses low and high pressure air to expand a pre-form part in a mold cavity. Typically the blow molding process uses 4 valves, a high pressure valve, a low pressure valve and two exhaust valves. The high and low pressure valves are known as the blow valves because these valves supply the air used to "blow" the pre-form into its final shape. The valves are typically connected to a valve block and the valve block feeds the blow nozzle that forms a seal against the pre-form/bottle inlet. The space between the outlets on the blow valves and the pre-form/bottle inlet is known as dead space. The dead space is filled, first with low pressure air, and then with high pressure air, for each blow mold cycle. The low and high pressure air must also be vented from the dead space during each blow molding cycle.

Older blow molding machines connected the blow valves to the valve block using low and high pressure lines. The pressure lines and the passageways in the valve block created large dead spaces, causing slow cycle times. Some newer blow molding machines attached the blow valves and exhaust valves directly to the valve block, eliminating the pressure lines between the valves and the valve block and thereby reducing the dead space. An example of a blow molding machine that attaches the blow valves and exhaust valves directly to the valve block is disclosed in U.S. Pat. No. 6,905,326 to Voth et al. entitled "Blow molding machine comprising control valves, which are mounted on the blowing device and which control the blowing air" which is hereby incorporated by reference. These newer blow molding machines still have dead space formed along the entire length of the passageways formed in the valve block (also called a valve carrier) that connect the blow valves to the blow nozzle.

SUMMARY OF THE INVENTION

A blow molding machine having the valves integrated into the valve block is disclosed. The valve pistons form annular rings stacked vertically along the stretch rod/blow nozzle axis. The valve pistons activate by moving up/down along the stretch rod/blow nozzle axis. The sealing surface for each vertically stacked valve is formed around the stretch rod/blow nozzle.

ASPECTS

One aspect of the invention includes, a blow molding machine having a valve block with a stretch rod/blow nozzle extending through a hole in the valve block, characterized by:

a cylindrical bore formed in the valve block where the cylindrical axis of the cylindrical bore is parallel with the stretch rod/blow nozzle and concentric with the hole in the valve block and where the cylindrical bore has a bottom surface;

a valve piston having a generally circular shape with a central hole where the valve piston is located in the cylindrical bore of the valve block with the stretch rod/blow nozzle passing through the central hole;

a sealing surface located on the valve piston where the sealing surface completely surrounds the stretch rod/blow nozzle, the valve piston configured to move between an open position and a closed position by moving along an axis formed by the stretch rod/blow nozzle;

the sealing surface configured to form a seal that surrounds the stretch rod/blow nozzle when the valve piston is in the closed position thereby preventing radial fluid flow into or away from the stretch rod/blow nozzle.

Preferably, the sealing surface is on a bottom side of the valve piston and forms a seal against the bottom surface of the cylindrical bore.

Preferably, the sealing surface forms a seal against a control chamber ring installed into the cylindrical bore of the valve block.

Preferably, the sealing surface forms a seal against a top surface of the control chamber ring.

Preferably, the sealing surface is adjacent to the central hole of the valve piston.

Preferably, the sealing surface has a shape selected from the following group: circular, oval, square, rectangular, rounded rectangle, octagonal.

Preferably, an operating chamber ring located in the cylindrical bore where the operating chamber ring is a generally flat circular shape with an inner hole where the outer diameter of the operating chamber ring is configured to seal against the inner diameter of the cylindrical bore;

a plurality of tabs extending downwards from a bottom side of the operating chamber ring forming a plurality of gaps spaced around the bottom surface of the operating chamber ring where the plurality of tabs rest on the bottom surface of the cylindrical bore;

a circular groove formed in the wall of the cylindrical chamber and located at the bottom edge of the cylindrical chamber such that fluid in the circular groove can flow into the plurality of gaps spaced around the bottom surface of the operating chamber ring.

Preferably, a control chamber ring located in the cylindrical bore where the control chamber ring has a flat ring shaped top with a first cylindrical section extending downward from an outer diameter of the flat ring shaped top and a second cylindrical section extending downward from an inner diameter of the flat ring shaped top and where a plurality of slots are formed in the bottom of the first cylindrical section and where the outer diameter of the control chamber ring is configured to seal against the inner diameter of the cylindrical bore;

the valve piston is sealed between the first cylindrical section and the second cylindrical section forming a control chamber in a top part of the control chamber ring with a plurality of holes passing through the first cylindrical section near the flat ring shaped top into the control chamber.

Another aspect of the invention comprises a plurality of stackable valves where each valve is characterized by:

an operating chamber ring having a flat ring shaped body with a plurality of tabs where the plurality of tabs are spaced around the outer perimeter of the flat ring shaped body and extend downward from a bottom side of the flat ring shaped body;

a control chamber ring stacked on top of the operating chamber ring where the control chamber ring has a flat ring shaped top with a first cylindrical section extending downward from an outer diameter of the flat ring shaped top and a second cylindrical section extending downward from an inner diameter of the flat ring shaped top and where a bottom of the first cylindrical section rest on a top side of the operating chamber ring and where a plurality of slots are formed in the bottom of the first cylindrical section;

a valve piston captured between the operating chamber ring and the control chamber ring where the valve piston has a generally flat disk shaped top with a third cylindrical section extending downwards at an inner diameter of the generally flat disk shaped top and where a bottom surface of the third cylindrical section forms a sealing surface, the valve piston configured to move between an open position and a closed position by moving along the cylindrical axis of the third cylindrical section.

Preferably, a first one of the plurality of stackable valves is stacked on top of a second one of the plurality of stackable valves and where the sealing surface of the valve piston in the first one of the plurality of stackable valves seals against a top surface of the control chamber ring in the second one of the plurality of stackable valves.

Preferably, a first one of the plurality of stackable valves is stacked on top of a second one of the plurality of stackable valves and where the plurality of tabs on the operating chamber ring in the first one of the plurality of stackable valves rest against a top surface of the control chamber ring in the second one of the plurality of stackable valves creating a plurality of gaps that allow radial fluid flow between the operating chamber ring in the first one of the plurality of stackable valves and the top surface of the control chamber ring in the second one of the plurality of stackable valves.

Preferably, a first one of the plurality of stackable valves is stacked on top of a second one of the plurality of stackable valves and where a bottom surface of the first cylindrical section of the control chamber ring in the first one of the plurality of stackable valves is spaced above a top surface of the control chamber ring in the second one of the plurality of stackable valves creating a gap of height h that allow radial fluid flow between the bottom surface of the first cylindrical section of the control chamber ring in the first one of the plurality of stackable valves and the top surface of the control chamber ring in the second one of the plurality of stackable valves.

Preferably, the plurality of stackable valves is located inside a cylindrical bore in a valve block.

Preferably, the plurality of stackable valves are stacked and flanged to each other.

Another aspect of the invention comprises a method of operating a blow molding machine having a first fluid passageway formed along a length of a stretch rod/blow nozzle, characterized by:

supplying fluid, during a first blow molding step, to the first fluid passageway through a first ring shaped passageway that surrounds the first fluid passageway;

sealing the first ring shaped passageway, during a second blow molding step, with a sealing member that surrounds the first fluid passageway.

Preferably, the method further comprises venting the fluid, during a third blow molding step, from the first fluid passageway through a second ring shaped passageway that surrounds the first fluid passageway.

Another aspect of the invention comprises a method of assembling a blow molding machine, characterized by:

(a) inserting an operating chamber ring into a cylindrical chamber formed in a valve block;

(b) inserting a valve piston into the cylindrical chamber;

(c) inserting a control chamber ring into the cylindrical chamber thereby capturing the valve piston between the operating chamber ring and the control chamber ring;

repeating steps (a)-(c) at least one more time.

Preferably, the method further comprises forming a seal between a wall of the cylindrical chamber and an outer diameter of the operating chamber ring when the operating chamber ring is inserted into the cylindrical chamber;

forming a seal between the wall of the cylindrical chamber and an outer diameter of the control chamber ring when the control chamber ring is inserted into the cylindrical chamber.

DETAILED DESCRIPTION OF THE PREFERRED EMBODIMENT

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
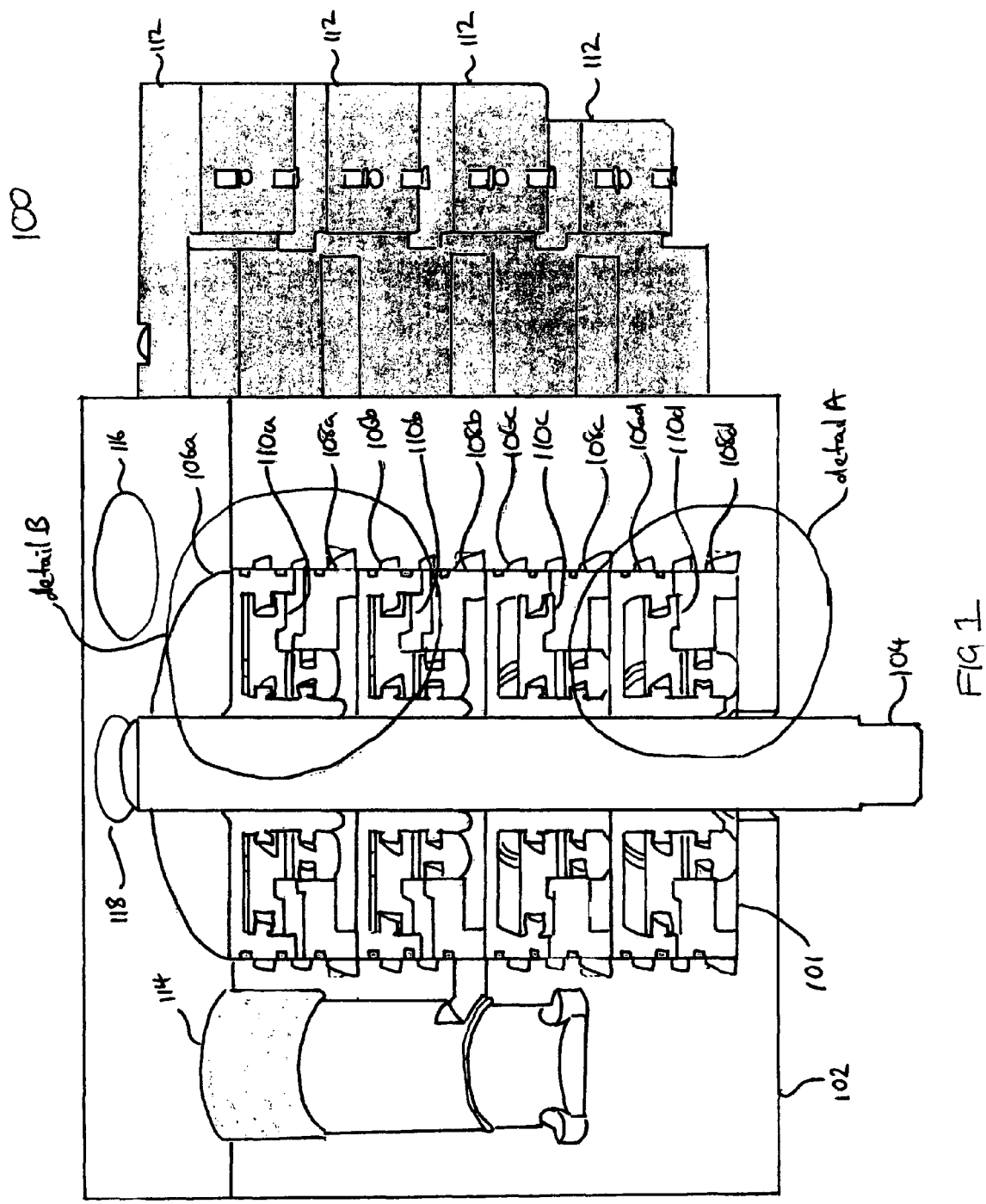
FIG. 1 is a cross sectional isometric view of valve block assembly 100 in an example embodiment of the invention.

FIG. 1 is a cross sectional isometric view of valve block assembly 100 in an example embodiment of the invention. Valve block assembly 100 comprises valve block 102, stretch rod/blow nozzle 104, four control chamber rings 106a-106d, four operating chamber rings 108a-108d, four valve pistons 110a-110d and four pilot valves 112. Valve block 102 has a central cylindrical chamber 101. The stretch rod/blow nozzle 104 extends vertically through the center of the central chamber 101 and out through a hole in the bottom of the central cylindrical chamber 101. Four sets of valves are vertically stacked in the central cylindrical chamber 101 around the stretch rod/blow nozzle 104. Each valve comprises a control chamber ring, an operating chamber ring and a valve piston. The bottom or lowest valve comprises operating chamber ring 108d sitting against the bottom surface of the central cylindrical chamber 101 in valve block 102, control chamber ring 106d sitting on top of operating chamber ring 108d and valve piston 110d captured between the control chamber ring 106d and the operating chamber ring 108d. Valve block 102 also has a number of inlet and outlet ports (114, 116 and 118) for feeding low pressure, high pressure, and exhaust air to and from the different valves. The two upper valves in valve bock assembly 100 are shown in the open position and the two lower valves are shown in the closed position. In one example embodiment of the invention, the order of the valves from top to bottom is P1, AR, P2, exhaust, but in other example embodiments the order of the valve may be different.

Figure 2A:
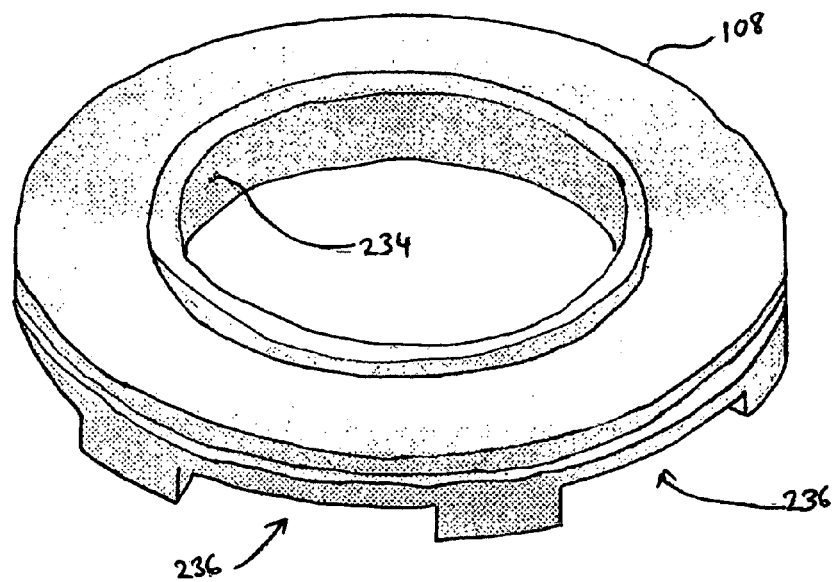
FIG. 2a is an isometric top view of an operating chamber ring 108 in an example embodiment of the invention.
Figure 2B:
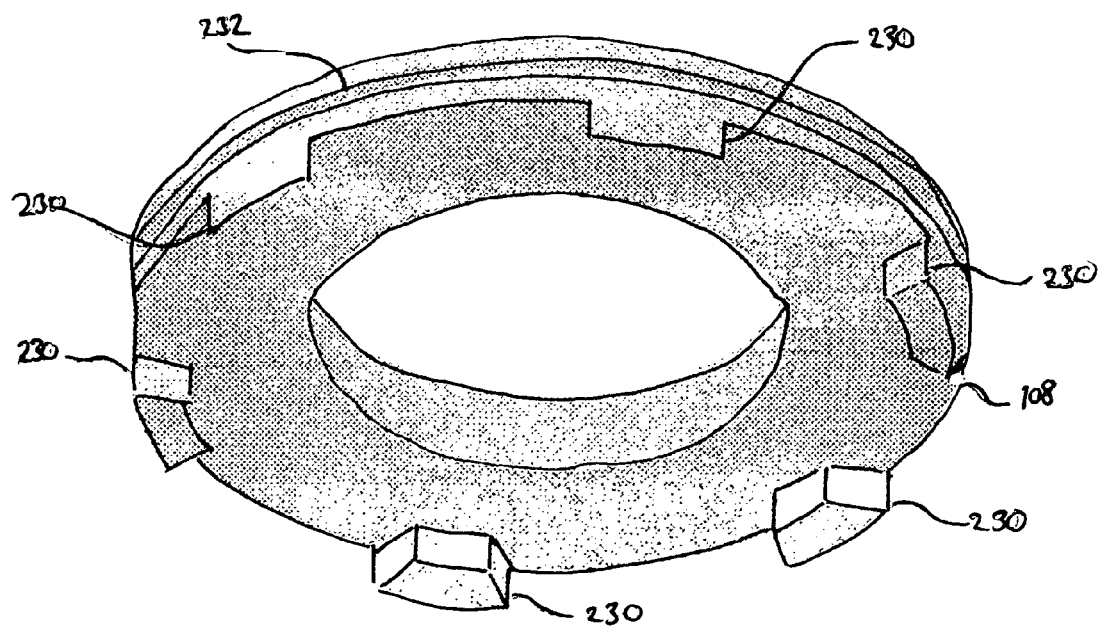
FIG. 2b is an isometric bottom view of an operating chamber ring 108 in an example embodiment of the invention.

FIG. 2a is an isometric top view of an operating chamber ring 108 in an example embodiment of the invention. FIG. 2b is an isometric bottom view of an operating chamber ring 108 in an example embodiment of the invention. Operating chamber ring 108 is a generally circular part having a generally flat ring shaped body with a plurality of tabs 230 extending down from the generally flat ring shaped body. An O-ring or gasket groove 232 is formed in the outer edge of the generally flat ring shaped body. The inner diameter 234 of the generally flat ring shaped body forms a sealing surface for the valve piston (not shown). In operation, the operating chamber ring 108 is stacked against the bottom surface of the central cylindrical chamber 101 formed in the valve block 102, or against the top of a control chamber ring 106. An O-ring or gasket 580 installed in the O-ring or gasket groove 232 seals against the cylindrical walls of the central cylindrical chamber 101 formed in the valve block 102. The plurality of tabs 230 hold the generally flat ring shaped body above the bottom of the central chamber or above the top of a control chamber, forming a plurality of gaps 236. The plurality of gaps 236 allow radial air flow from the valve block, towards the stretch rod/blow nozzle 103, underneath the generally flat ring shaped body.

Figure 3A:
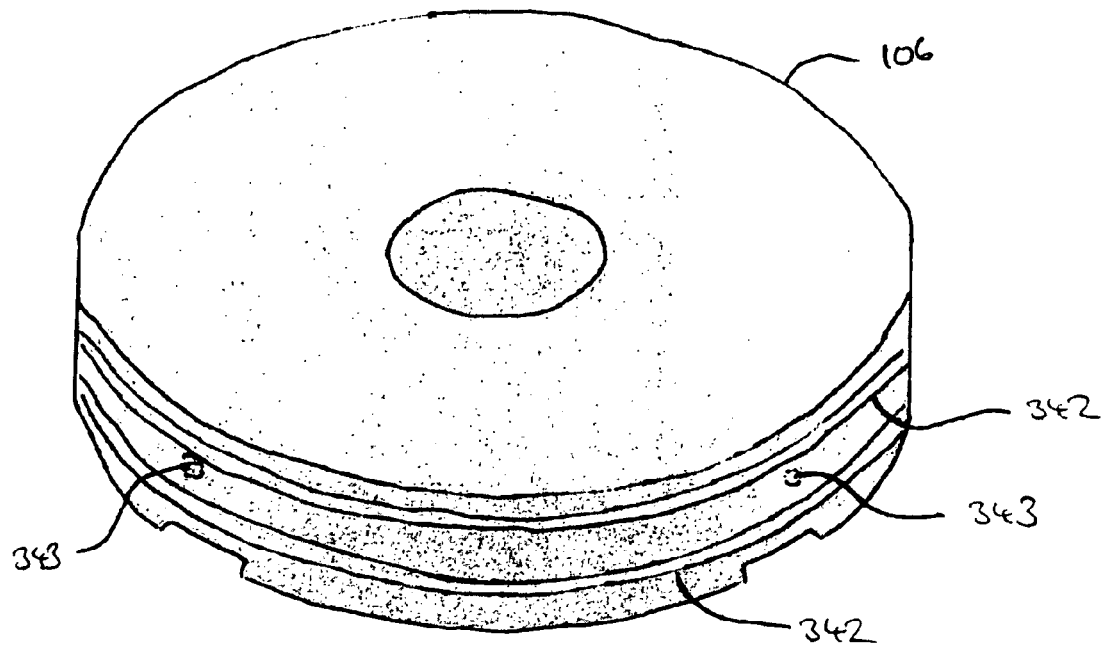
FIG. 3a is an isometric top view of a control chamber ring 106 in an example embodiment of the invention.
Figure 3B:
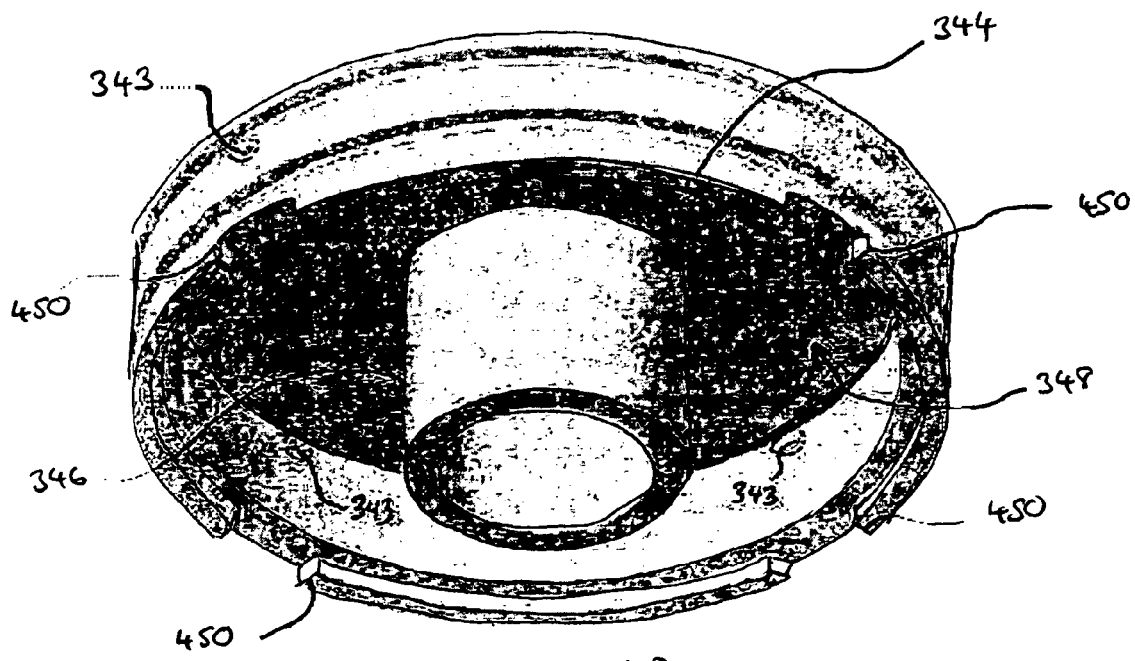
FIG. 3b is an isometric bottom view of a control chamber ring 106 in an example embodiment of the invention.

FIG. 3a is an isometric top view of a control chamber ring 106 in an example embodiment of the invention. FIG. 3b is an isometric bottom view of a control chamber ring 106 in an example embodiment of the invention. Control chamber ring 106 has a generally flat disk shaped body with a central hole. An inner hollow cylindrical section 346 extends downward from the inner edge of central hole of the generally flat disk shaped body and an outer cylindrical section 344 extends downward from the outer edge of the generally flat disk shaped body. Two O-ring or gasket grooves 342 are formed in the outer diameter of the outer cylindrical section 344. A plurality of holes 343 are also formed in the outer cylindrical section 344. In one example embodiment of the invention the holes are formed between the two O-ring or gasket grooves 342 on the outer diameter of the outer cylindrical section 344. The holes angle upward and exit near the top of the inner diameter of the outer cylindrical section 344. The inner surface of the outer cylindrical section 344 and the outer surface of the inner hollow cylindrical section 346 form sealing surfaces for the valve piston 110. A plurality of channels or gaps 450 are formed in the bottom of the outer cylindrical section 344. In operation, a control chamber ring 106 is inserted into the central chamber formed in the valve block 102, and stacked on top of an operating chamber ring 108, capturing a valve piston 110 in-between the operating chamber ring 108 and the control chamber ring 106. O-rings or gaskets installed in the O-ring or gasket grooves 342 form seals between the control chamber ring 106 and the cylindrical walls of the central cylindrical chamber 101 formed in the valve block 102.

Figure 4A:
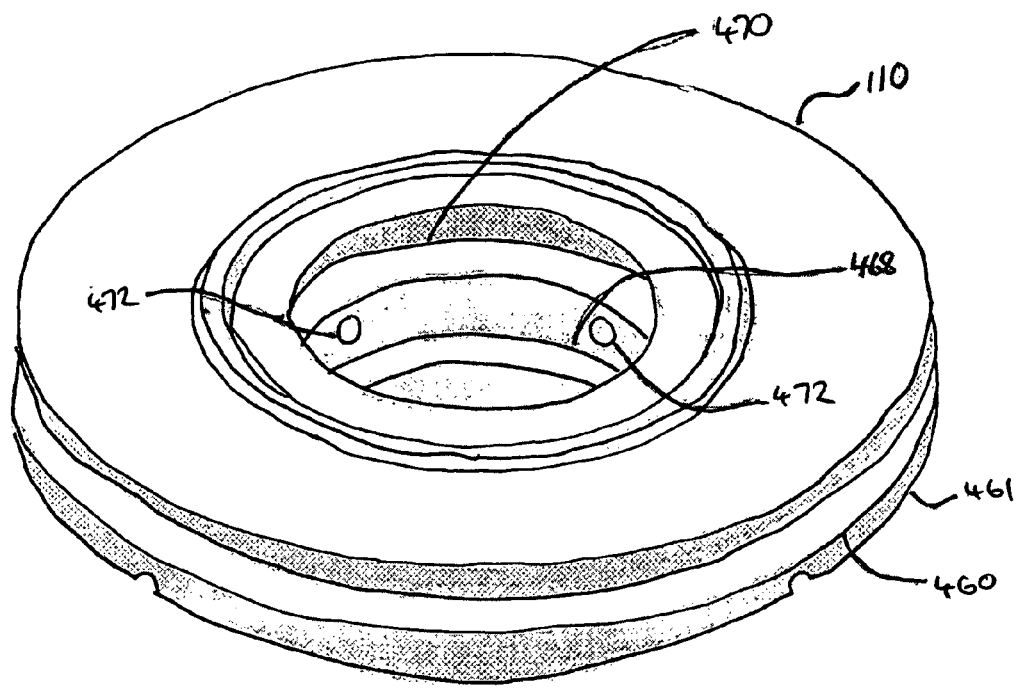
FIG. 4a is an isometric top view of a valve piston 110 in an example embodiment of the invention.
Figure 4B:
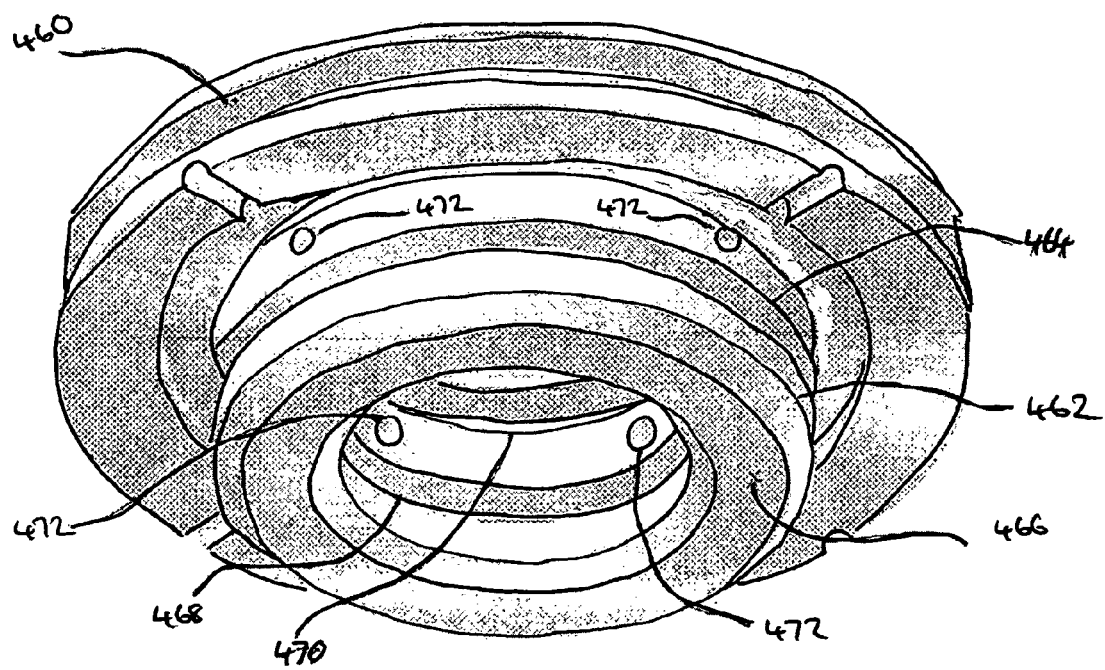
FIG. 4b is an isometric bottom view of a valve piston 110 in an example embodiment of the invention.

FIG. 4a is an isometric top view of a valve piston 110 in an example embodiment of the invention. FIG. 4b is an isometric bottom view of a valve piston 110 in an example embodiment of the invention. Valve piston 106 is a generally circular part with a flat disk shaped top section 461 with a central hole and a generally cylindrical section 462 extending downward from the inner diameter of the hole in the center of the disk shaped top section 461. The outer edge of the disk shaped top section 461 has a groove 460 configured to hold a first seal. The outer diameter of the generally cylindrical section 464 has a groove 460 configured to hold a second seal. The bottom surface 466 of the generally cylindrical section 464 forms a valve surface and seals against the bottom surface of the central cylindrical chamber formed in the valve block 102, or against the top of a control chamber ring 106. The inner diameter of the generally cylindrical section 464 has a first and second groove (468 and 470) configured to hold a third and fourth seal (not shown). A plurality of breath holes 472 for the O-rings or gaskets are formed radially through the top segment of the generally cylindrical section 464. In operation, valve piston travels vertically along an axis concentric with the cylindrical axis of the generally cylindrical section 464. The first seal in groove 460 forms a seal with the inner diameter of the outer cylindrical section 344 of the control chamber ring 106. The second seal in groove 464 form a seal with the inner surface 234 of an operating chamber ring 108. The third and fourth seals in grooves 468 and 470 form seals against the outer diameter of the inner hollow cylindrical section 346 of the control chamber ring 106.

Figure 5:
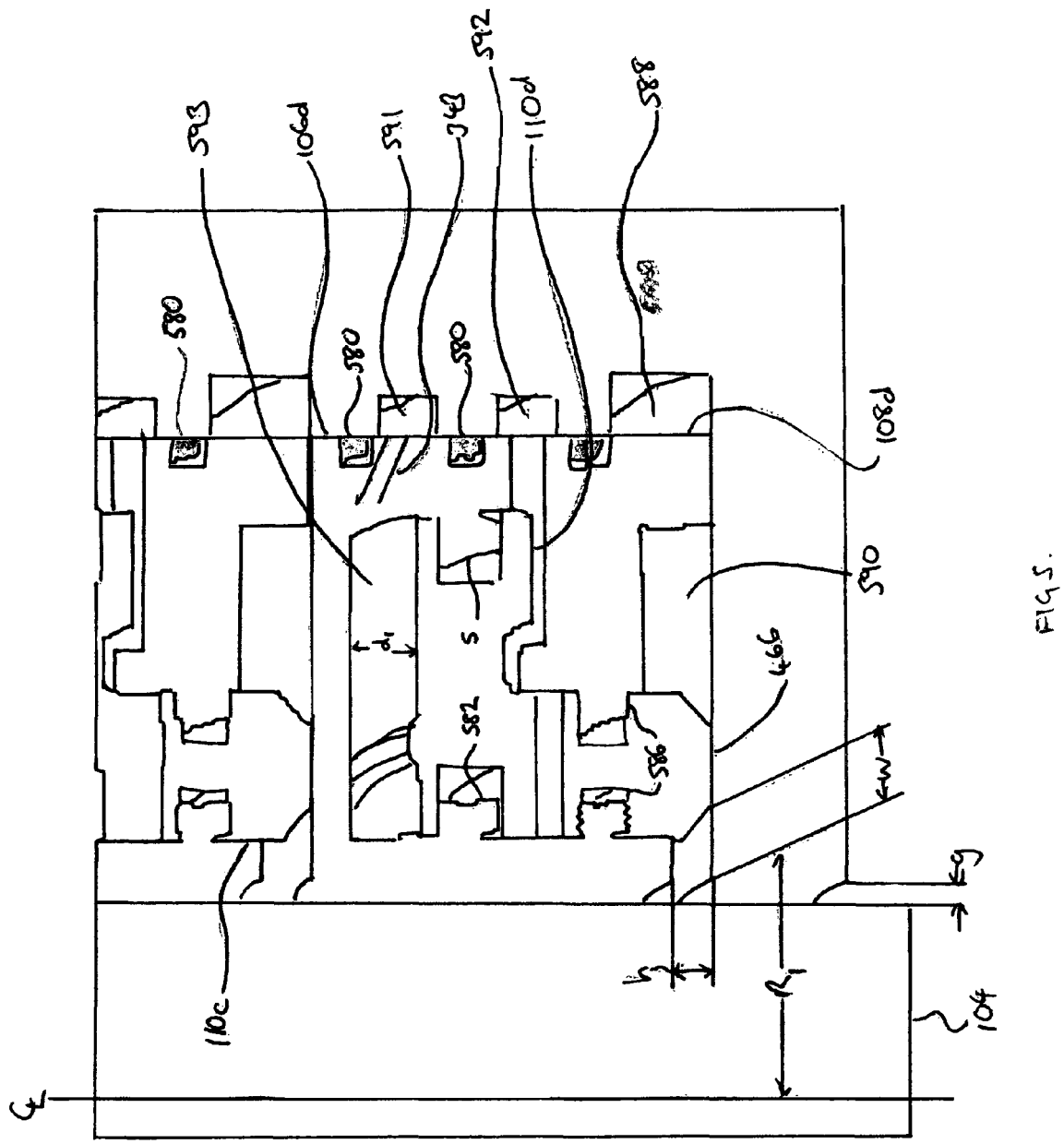
FIG. 5 is detail A from FIG. 1 in an example embodiment of the invention.

FIG. 5 is detail A from FIG. 1 in an example embodiment of the invention. FIG. 5 shows one side of the lowest valve comprising operating chamber ring 108d sitting against the bottom surface of the central cylindrical chamber 101 in valve block 102, control chamber ring 106d sitting on top of operating chamber ring 108d and valve piston 110d captured between the control chamber ring 106d and the operating chamber ring 108d. O-rings or gaskets 580 form seals between the operating chamber ring 108d and the valve block 102 and between the control chamber ring 106d and the valve block 102. Valve piston 110d is shown in the closed position with valve seat 466 sealed against the bottom surface of the central cylindrical chamber 101 formed in valve block 102. Valve seat 466 may also be called a sealing surface 466, a valve surface 466, or the like. Distance d1 between the top of valve piston 110d and the bottom of control chamber ring 106d is the maximum travel for valve piston 110d. The bottom of the inner hollow cylindrical section 346 of control chamber ring 106d does not contact the bottom surface of the central cylindrical chamber 101 in valve block 102, but forms a circular gap of height h that surrounds the stretch rod/blow nozzle 104. A passageway with width g is formed between the stretch rod/blow nozzle 104 and the valve block 102 and allows air to travel down the stretch rod/blow nozzle 104 and into the pre-form. The valve surface 466 is width w away from the entrance to the passageway running down the stretch rod/blow nozzle 104. The dead space is a cylindrical space having height h, radius R1 and thickness w.

Pilot air is fed through circular groove 591 formed in the cylindrical wall of central cylindrical section 101 and through holes 343 into control chamber 593, forcing valve piston down into the closed position. In one example embodiment of the invention the lowest valve is an exhaust or air recycle valve. Valve surface 466, sealed against the bottom of central cylindrical chamber, prevents air from flowing from the blown bottle (not shown) into exhaust chamber 590. When the valve is opened (not shown) air flows from the bottle, along the stretch rod/blow nozzle 104 passageway, underneath the valve surface 466 into exhaust chamber 590, between the gaps 236 formed between the tabs 230 on the bottom side of operating chamber ring 108d, and into circular groove 588. Air is vented through circular groove 588 formed in the cylindrical wall of the central cylindrical chamber 101 through a connection (not shown) to one of the outlet ports formed in valve block 102. Seals 586 installed in the second and third grooves formed in the valve piston 110d form seals between the valve piston and the control chamber ring 106d and the operating chamber ring 108d.

Figure 6:
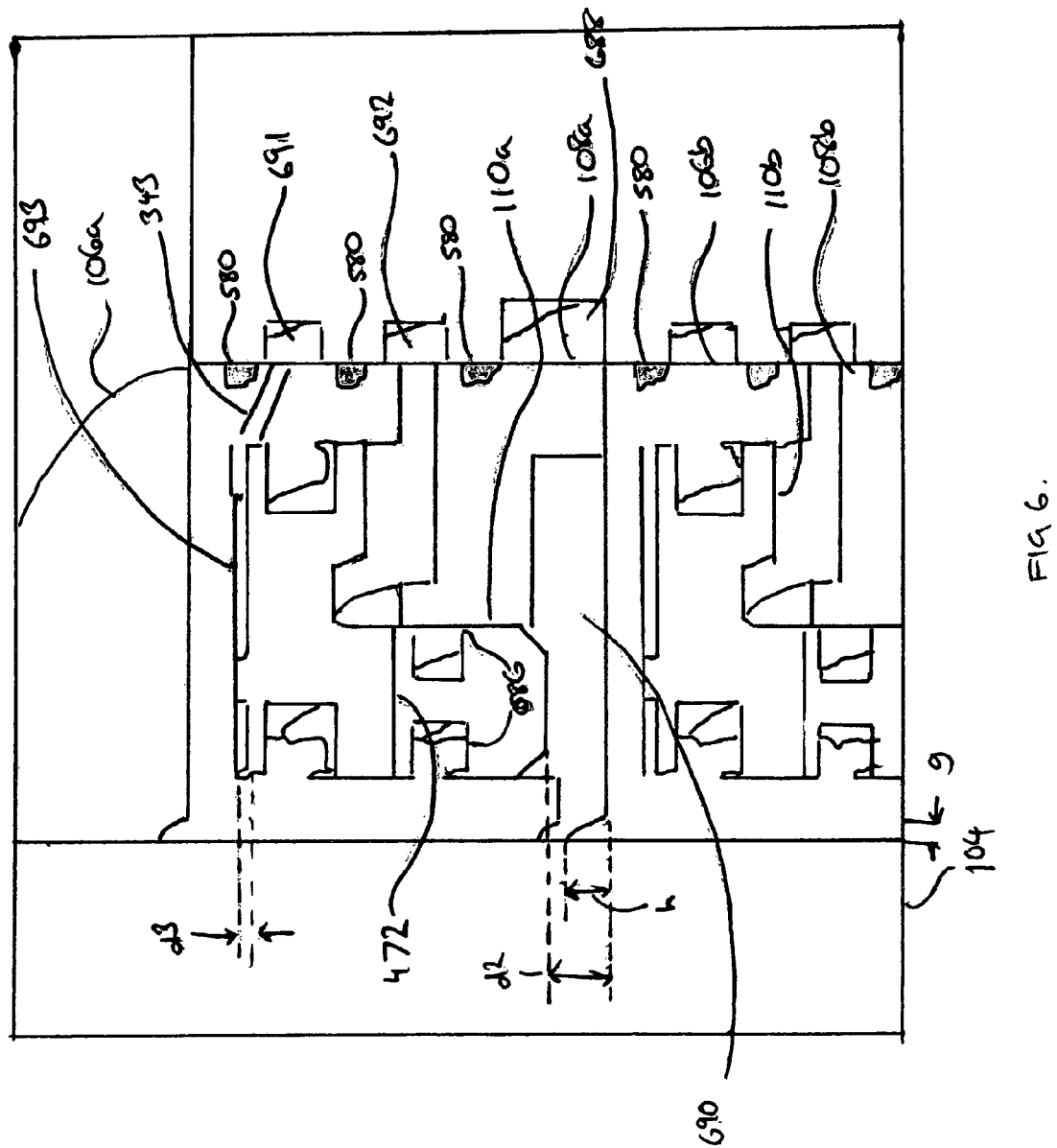
FIG. 6 is detail B from FIG. 1 in an example embodiment of the invention.

FIG. 6 is detail B from FIG. 1 in an example embodiment of the invention. FIG. 6 shows one side of the top valve in valve assembly 100 comprising operating chamber ring 108a sitting against the top surface of the control chamber ring 106b, control chamber ring 106a sitting on top of operating chamber ring 108a and valve piston 110a captured between the control chamber ring 106a and the operating chamber ring 108a. O-rings or gaskets 580 form seals between the operating chamber ring 108a and the valve block 102 and between the control chamber ring 106a and valve block 102. Valve piston 110a is shown in the open position with valve seat 466 above the top of control chamber ring 106b by distance d2. Valve piston 110a may have some clearance (distance d3) between the top of valve piston 110a and the bottom of control chamber ring 106a. The bottom of the inner hollow cylindrical section 346 of control chamber ring 106a does not contact the top surface of control chamber ring 106b, but forms a circular gap of height h that surrounds the stretch rod/blow nozzle 104. A passageway with width g is formed between the stretch rod/blow nozzle 104 and the inner diameter of the control chamber rings and allows air to travel down the stretch rod/blow nozzle 104 and into the pre-form.

Pilot air is exhausted from control chamber 693 through holes 343 and into circular groove 691 formed in the cylindrical wall of central cylindrical section 101, allowing valve piston 110a to be forced into the open position by low pressure air in chambers 688 and 690. In one example embodiment of the invention the top valve is a P1 valve. The gap between valve surface 466 and the top of control chamber ring 106b allows air to flow from circular groove 688, between the gaps 236 formed between the tabs 230 on the bottom side of operating chamber ring 108a into chamber 690, underneath the valve surface 466 and along stretch rod/blow nozzle 104 passageway and into the pre-form (not shown). The low pressure air is supplied through circular groove 688 formed in the cylindrical wall of the central cylindrical chamber 101 through a connection (not shown) to one of the inlet ports formed in valve block 102. Seals 686 installed in the second and third grooves formed in the valve piston 110a form seals between the valve piston and the control chamber ring 106a and the operating chamber ring 108a.

The example embodiments disclosed above show the active valve surfaces or sealing surfaces (surface 466) forming circular rings around the stretch rod/blow nozzle. Other shapes are possible in other example embodiments, for example square, rectangular, rounded rectangle, octagonal, oval, and the like. The example embodiments disclosed above show the sealing surfaces on the bottom side of the valve piston. In other embodiments the sealing surface may be on the top side of the valve pistons or the sealing surface may be around the periphery of the piston. The example embodiments disclosed above show the stackable valves installed into a cylindrical bore inside a valve block. In other example embodiments the control chamber ring and operating chamber ring may be configured to be clamped or fastened together such that a valve block is not needed.

We claim:

1. A blow molding machine having a valve block (102) with a stretch rod/blow nozzle (104) extending through a hole in the valve block (102), characterized by:
    a cylindrical bore (101) formed in the valve block (102) where the cylindrical axis of the cylindrical bore (101) is parallel with the stretch rod/blow nozzle (104) and concentric with the hole in the valve block (102) and where the cylindrical bore (101) has a bottom surface;
    a valve piston (110) having a generally circular shape with a central hole where the valve piston (110) is located in the cylindrical bore (101) of the valve block (102) with the stretch rod/blow nozzle (104) passing through the central hole;
    a sealing surface (466) located on the valve piston (110) where the sealing surface (466) completely surrounds the stretch rod/blow nozzle (104), the valve piston (110) configured to move between an open position and a closed position by moving along an axis formed by the stretch rod/blow nozzle (104);
    the sealing surface (466) configured to form a seal that surrounds the stretch rod/blow nozzle (104) when the valve piston (110) is in the closed position thereby preventing radial fluid flow into or away from the stretch rod/blow nozzle (104).

2. The blow molding machine of claim 1 where the sealing surface (466) is on a bottom side of the valve piston (110) and forms a seal against the bottom surface of the cylindrical bore (101).

3. The blow molding machine of claim 1 where the sealing surface (466) forms a seal against a control chamber ring (106) installed into the cylindrical bore (101) of the valve block (102).

4. The blow molding machine of claim 3 where the sealing surface (466) forms a seal against a top surface of the control chamber ring (106).

5. The blow molding machine of claim 1 where the sealing surface (466) is adjacent to the central hole of the valve piston (110).

6. The blow molding machine of claim 1 where the sealing surface (466) has a shape selected from the following group: circular, oval, square, rectangular, rounded rectangle, octagonal.

7. The blow molding machine of claim 1 further characterized by:
    an operating chamber ring (108) located in the cylindrical bore (101) where the operating chamber ring (108) is a generally flat circular shape with an inner hole where the outer diameter of the operating chamber ring is configured to seal against the inner diameter of the cylindrical bore (101);
    a plurality of tabs (230) extending downwards from a bottom side of the operating chamber ring (108) forming a plurality of gaps (236) spaced around the bottom surface of the operating chamber ring (108) where the plurality of tabs (230) rest on the bottom surface of the cylindrical bore (101);
    a circular groove (588) formed in the wall of the cylindrical chamber (101) and located at the bottom edge of the cylindrical chamber (101) such that fluid in the circular groove (588) can flow into the plurality of gaps (236) spaced around the bottom surface of the operating chamber ring (108).

8. The blow molding machine of claim 1 further characterized by:
    a control chamber ring (106) located in the cylindrical bore (101) where the control chamber ring (106) has a flat ring shaped top with a first cylindrical section (344) extending downward from an outer diameter of the flat ring shaped top and a second cylindrical section (346) extending downward from an inner diameter of the flat ring shaped top and where a plurality of slots (450) are formed in the bottom of the first cylindrical section (344)

and where the outer diameter of the control chamber ring (106) is configured to seal against the inner diameter of the cylindrical bore (101);

the valve piston (110) is sealed between the first cylindrical section (344) and the second cylindrical section (346) forming a control chamber (593) in a top part of the control chamber ring (106) with a plurality of holes (343) passing through the first cylindrical section (344) near the flat ring shaped top into the control chamber (593).

* * * * *